April 24, 1962  G. W. PAINTER  3,030,803
MEASUREMENT OF DYNAMIC PROPERTIES OF ELASTOMERS
AND LIKE FLEXIBLE MATERIALS
Filed Jan. 26, 1959  2 Sheets-Sheet 1

INVENTOR.
Giles W. Painter
BY Ralph Hammer
Attorney

April 24, 1962 G. W. PAINTER 3,030,803
MEASUREMENT OF DYNAMIC PROPERTIES OF ELASTOMERS
AND LIKE FLEXIBLE MATERIALS INVENTOR.
Giles W. Painter
BY Ralph Hammar
Attorney

United States Patent Office 3,030,803
Patented Apr. 24, 1962

3,030,803
MEASUREMENT OF DYNAMIC PROPERTIES OF ELASTOMERS AND LIKE FLEXIBLE MATERIALS
Giles Warren Painter, Erie, Pa., assignor to Lord Manufacturing Company, Erie, Pa., a corporation of Pennsylvania
Filed Jan. 26, 1959, Ser. No. 789,194
6 Claims. (Cl. 73—67.1)

Elastomers such as used in vibration mountings have elastic and damping properties which vary with the frequency of the stress so that measurements under static conditions do not necessarily correspond to the properties under conditions encountered in service. This invention is intended to measure the dynamic properties over the frequency range in which an elastomer may be used. A modification measures mechanical impedance.

In the apparatus, test specimens of the elastomer are used as vibration mountings which are mounted on a shake table and which support a known mass. As the shake table is driven, the supported mass undergoes an excursion relative to the shake table which varies not only with the frequency of excitation but also with the elastic and damping properties of the elastomer under test. Although the stress in the elastomer is due to the motion of the mass relative to the shake table, the apparatus does not measure the relative motion but instead measures the absolute accelerations of the shake table and of the supported mass. From these measurements a signal representing the relative acceleration of the mass with respect to the shake table is determinable. The magnitude of this signal can be varied by a gain control and then added to the signal representing the absolute acceleration of the mass. The minimum resultant signal which can be obtained will represent that component of mass acceleration due to the internal damping of the material under test. From this information and the size of the test specimen and of the supported mass, the elastic modulus and the damping modulus of the test material are readily calculated. In the modification, the product of a coefficient times the acceleration component of the output of a mechanical impedance pickup at any exciting frequency is subtracted from the force component of the pickup output thereby producing at the minimum value voltages corresponding to the reactive and damping forces from which the mechanical impedance can be directly determined.

Figure 1:
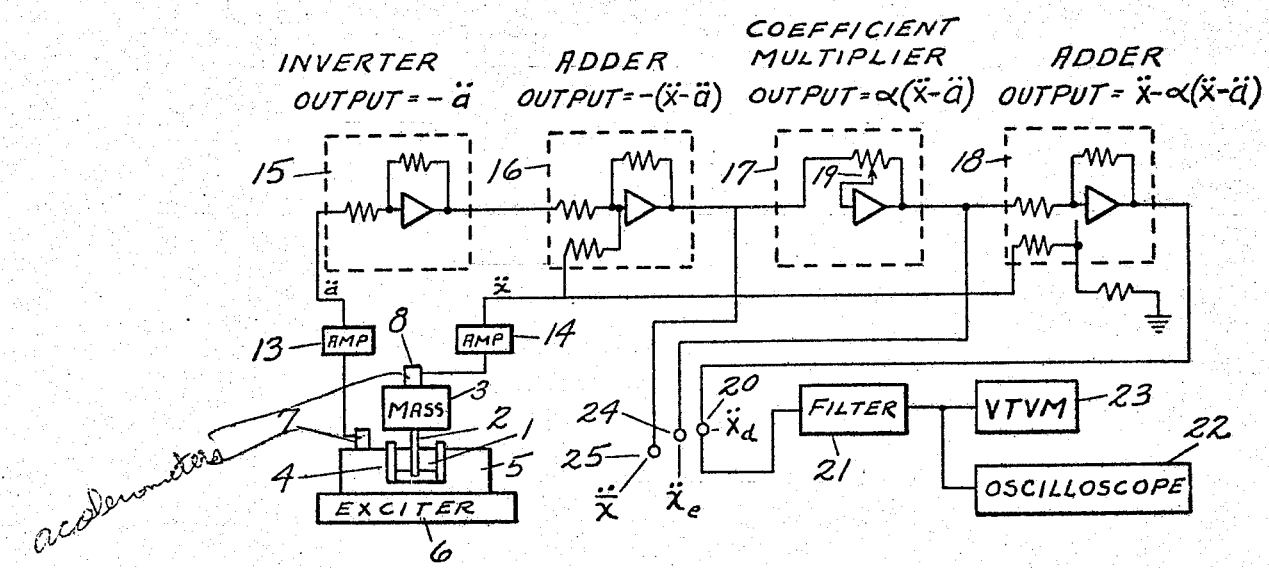
Figure 2:
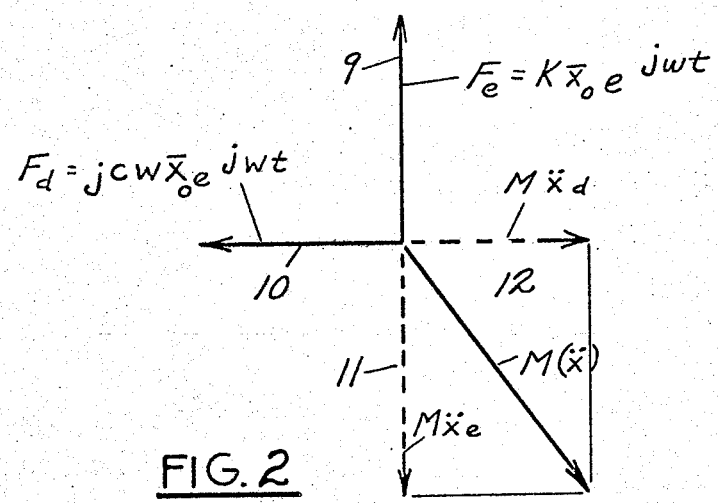
Figure 3:
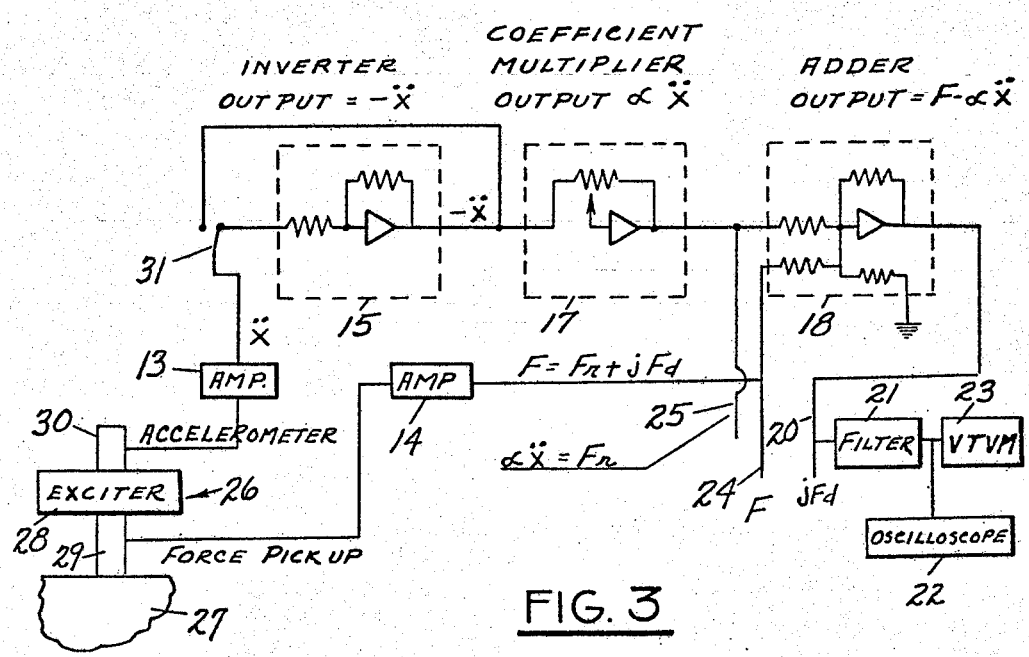
Figure 4:
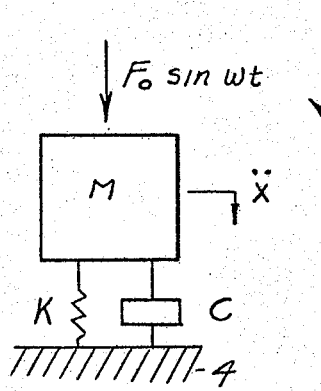
Figure 5:
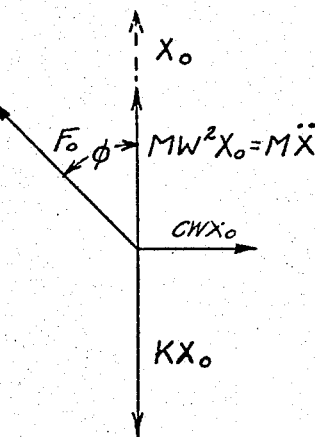
Figure 6:
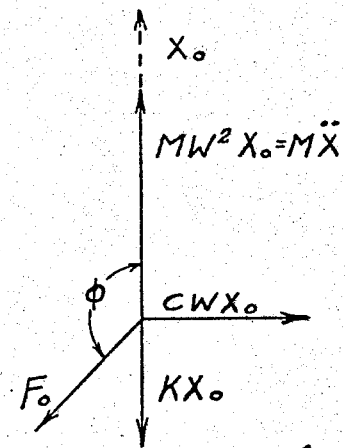

In the drawing, FIG. 1 is a diagram of the test apparatus, FIG. 2 is a vector diagram, FIG. 3 is a diagram of the test apparatus for measurement of mechanical impedance, FIG. 4 is a diagram of a mechanical impedance pickup, FIG. 5 is a vector diagram of mechanical impedance when the elastic force is greater than the inertia force, and FIG. 6 is a similar vector diagram when the inertia force exceeds the elastic force.

In the drawing, the material under test comprises bodies 1 of an elastomer or like flexible material bonded to opposite sides of a center plate 2 carrying a supported mass 3 and also bonded to end plates 4 fixed to a shake table 5 driven by an exciter 6. The bodies 1 are of known area and thickness. The shake table may be driven through a wide range of frequencies and amplitudes and is a common apparatus for investigating the effect of vibration.

The acceleration of the shake table 5 is measured by an accelerometer 7 mounted on the table. If the exciter is driven at an amplitude and frequency represented by the vector $a_0 e^{j\omega t}=a$ the output of the accelerometer 7 will be $-\omega^2 a_0 e^{j\omega t}=\ddot{a}$.

The acceleration of the mass 3 is measured by an accelerometer 8 mounted on the mass. If the motion of the mass is represented by the vector $x_0 e^{j(\omega t+\phi)}=x$, the output of the accelerometer 8 will be $-\omega^2 x_0 e^{j(\omega t+\phi)}=\ddot{x}$, where $\phi$ is a phase angle.

The force for moving the shake table 5 comes directly from the exciter 6. The force for moving the mass 3 also comes from the exciter 6 but is transmitted through the bodies 1 of the elastomer undergoing test. The magnitude of the force transmitted to the mass is a function of the deflection of the bodies 1 or to the difference between the motion of the shake table 5 and the motion of the mass 3. At a given mass and frequency the relative motion between the mass 3 and the shake table 5 is dependent upon elastic and damping forces in the elastomer.

The elastic and damping forces 9 and 10 transmitted to the supported mass 3 are at right angles to each other as shown in the vector diagram of FIG. 2 and each force produces a component of acceleration in the supported mass. The force 9 due to the elastic modulus of the test material 1 is proportional to the magnitude of the relative displacement of the mass 3 and shake table 5. If the relative displacement of the shake table and mass is designated as the vector $\bar{x}_0 e^{j\omega t}$, the force exerted on the mass 3 due to the elastic modulus of the test material is equal to $F_e = k\bar{x}_0 e^{j\omega t}$ ($k$ being a constant equal to the product of the elastic modulus of the specimen by its area divided by its length) and the product of the resultant acceleration and the supported mass 3 will be the equal and opposite vector 11 having a value $M\ddot{x}_e$ where $\ddot{x}_e$ is the component of acceleration of the mass $M$ in phase with the elastic force corresponding to the vector 9.

The force due to the damping modulus of the test material 1 indicated by the vector 10 is proportional to $F_d = jc\omega \bar{x}_0 e^{j\omega t}$ ($c$ being a constant equal to the product of the damping modulus of the specimen by its area divided by its length) and the resultant acceleration of the supported mass 3 produced by the force corresponding to the vector 10 is indicated by the equal and opposite vector 12 having a value $M\ddot{x}_d$ where $\ddot{x}_d$ is the component of acceleration of the supported mass due to the force indicated by the vector 10.

While the output of the accelerometer 7 is made up of a single component directly in phase with the motion of the exciter 6 the output of the accelerometer 8 on the supported mass 3 is made up of two components neither of which is directly in phase with the exciter 6. However, the relative acceleration of the supported mass represented by the difference between the outputs of the accelerometers 8 and 7 is in phase with $\ddot{x}_e$. By a process of vector subtraction, it is possible to obtain directly the components of acceleration due respectively to the elastic and to the damping properties of the test material.

To perform this vector subtraction, the output of the accelerometer 7 is fed through an amplifier 13 and the output of the accelerometer 8 is fed through an identical amplifier 14. The output of amplifier 13 which is proportional to the acceleration of the exciter 6 is first fed through an inverter 15 which merely reverses the sign so that the output is the negative of the input. The output of the inverter 15 and of the amplifier 14 are fed to an adder 16 which has an output equal to $-(\ddot{x}-\ddot{a})$ or $-\ddot{x}$. The output of the adder 16 is fed to a coefficient multiplier 17 which multiplies the input by a coefficient $\alpha$ whose value can be varied. The output of the coefficient multiplier 17 together with the output of the amplifier 14 is fed to an adder 18 in such sense that the output is equal to $\ddot{x} - \alpha(\ddot{x}-\ddot{a})$. The output appearing at terminal 20 when fed through a distortion eliminating filter 21 can be visibly displayed on an oscilloscope 22 or numerically displayed on a vacuum tube volt meter 23.

When the control 19 for the coefficient multiplier is adjusted so that the reading of the volt meter 23 is the minimum, the voltage corresponds directly to the acceleration of the mass 3 due to the damping characteristics of the test material. At this setting of the control 19, the voltage appearing at terminal 24 corresponds to the acceleration of the mass 3 due to the elastic properties of the material being tested and the voltage appearing at terminal 25 corresponds to the relative acceleration of the mass 3 with respect to the shake table 5.

As shown in FIG. 1, (1) $$R = \text{voltage at terminal } 20 = \ddot{x} - \alpha(\ddot{x} - \ddot{a})$$

From Newton's second law:

(2) $$F_e + jF_d = M\ddot{x} = Me^{j\omega t}(\ddot{x}_e + j\ddot{x}_d)$$

Where $F_e$ = force amplitude due to elastic modulus of test material $F_d$ = force amplitude due to damping modulus of test material $\ddot{x}$ = instantaneous absolute acceleration of mass M $\ddot{x}_e$ = amplitude of absolute acceleration of mass M due to elastic properties of test material $\ddot{x}_d$ = amplitude of absolute acceleration of mass M due to damping properties of test material If the displacement of the mass M relative to the shake table 5 is designated as (3) $$x - a = \bar{x} = \bar{x}_0 e^{j\omega t}$$

Where $x$ = instantaneous displacement of mass M
$a$ = instantaneous displacement of shake table 5 then the acceleration of the mass M relative to the shake table 5

(4) $$= \ddot{\bar{x}} = -\omega^2 \bar{x}_0 e^{j\omega t}$$

Dividing Equations 2 by M and substituting Equations 2, 3, 4 in 1:

(5) $$R = e^{j\omega t}(\ddot{x}_e - \alpha\omega^2\bar{x}_0 + j\ddot{x}d)$$

(6) Equation 5 will be a minimum when $$\alpha\omega^2 \bar{x}_0 = \alpha(\ddot{x} - \ddot{a}) = \ddot{x}_e$$

From this data (7) $G'$ = elastic modulus of test material in shear $$\frac{\ddot{x}_e}{\ddot{x}_0} \frac{Mt\omega^2}{A}$$

Where
$M$ = mass
$t$ = thickness of test material
$A$ = area of test material
$\omega^2 = (2\pi \text{ exciting frequency})^2$
$\ddot{x}_e$ = voltage at terminal 24
$\ddot{x}_0$ = voltage at terminal 25 and (8) $G''$ = damping modulus of test material in shear $$= \frac{\ddot{x}_d}{\ddot{x}_0} \frac{Mt\omega^2}{A}$$

Where $\ddot{x}_d$ is the voltage at terminal 20 and the other symbols have the significance given in connection with Equation 7.

The apparatus is not limited to the measurement of the shear modulus but can be used for the modulus in tension or compression.

The apparatus is easy to use. The accelerometers 7, 8 are directly mounted on the shake table 5 and on the mass 3 supported by the test material. The addition and subtraction functions are carried out by standard analogue computer components 15—18. The specimen of test material is of standard dimensions so the computations required to determine the elastic modulus and the damping modulus at any exciting frequency are simple.

The apparatus has a high degree of accuracy even at very high frequencies where the amplitude is very small. Each accelerometer 7, 8 senses the information independent of the other with an accuracy determined by its design. The information sensed by the respective accelerometers is then fed to separate equipment for computing the desired information. The absence of mechanical connections in the performing of the vector subtraction of the information sensed by the accelerometers is an important factor in extending the frequency range to the higher frequency spectrum. At frequencies of from 1,000 to 2,000 cycles per second when the amplitude of vibratory movement would be exceedingly small, any equipment depending upon mechanical connections for making the vector subtraction would not be useful because the normal clearance in mechanical connections could exceed the amplitude of vibration.

FIGS. 3-6 illustrate the use of the apparatus to measure mechanical impedance. Mechanical impedance is defined as the ratio of force applied to a structure to the resulting velocity of the structure. Since both the force and the velocity can be complex numbers the determination of impedance involves both amplitude and phase measurements. The dynamic properties of elastomeric materials can be described from a mechanical impedance viewpoint if desired but the general procedure is to determine the force vs. displacement relation (from which the modulus can be readily determined) rather than the force vs. velocity relation. In general, the measurement of mechanical impedance of a structure involves mass effects as well as damping and elasticity.

In the measurement of mechanical impedance a device is used which consists of a small electromagnetic exciting unit having an accelerometer and a force pickup attached. When the unit is held against a structure whose mechanical impedance is to be measured, the device will read the magnitude of the alternating force applied to the structure and the resulting acceleration. The vibratory system involved is indicated in FIG. 4 where M, $k$ and $c$ represent the effective mass, spring and damping components possessed by the structure. The force $F_0 \sin \omega t$ is generated and indicated in FIG. 4 by the mechanical impedance pickup. The pickup also measures the acceleration of the mass ($\ddot{x}_a$). The differential equation for the system is (9) $$M\ddot{x} + c\dot{x} + kx = F_0 e^{j(\omega t + \phi)}$$

Where $$M = \text{mass} \left(\frac{\text{pounds seconds}^2}{\text{inches}}\right)$$

$$c = \text{damping coefficient} \left(\frac{\text{pounds seconds}}{\text{inches}}\right)$$

$$k = \text{elastic coefficient} \left(\frac{\text{pounds}}{\text{inches}}\right)$$

$x$ = mass displacement (inches)
$\phi$ = phase angle between $F_0$ and $x$
$F_0$ = amplitude of exciting force If we let $x = x_0 e^{j\omega t}$, we obtain $$(-M\omega^2 x_0 + jc\omega + kx_0)e^{j\omega t} = (F_0 e^{(j\omega t)} e^{j\phi})$$

or

(10) $$(kx_0 - M\omega^2 x_0) + j(c\omega) = F_0 e^{j\phi} = F_0 \cos\phi + jF_0 \sin\phi$$

Equation 10 can be represented as four vectors in equilibrium and rotating at a frequency $\omega$ as shown in FIGS. 5 and 6. When the inertia reactance ($M\omega^2 x_0$) is less than the elastic force ($kx_0$) the angle $\phi$ is less than 90° as shown in FIG. 5. Conversely when $kx_0$ is less than $M\omega^2 x_0$, $\phi$ is greater than 90° as is shown in FIG. 6. The mechanical impedance pickup measures the vectors $F_0$ and $M\omega^2 x_0$ (or $\ddot{x}$) directly. By means of operational amplifiers it is possible to obtain a signal R such that:

$$R = F_0 \pm \alpha \ddot{x}$$

where $\alpha$ is a coefficient which can be varied and R is the minimum signal which can be produced when $\alpha$ is varied. The vector difference ($kx_0 - M\omega^2 x_0$) will be referred to as the reactive force, $F_r$. The sign of $F_r$ (i.e., $kx_0 - M\omega^2 x_0$) will be positive when $kx_0$ is greater than $M\omega^2 x_0$ or $M\ddot{x}$ (FIG. 5) and will be negative when $M\omega^2 x_0$ or $M\ddot{x}$ is less than $kx_0$ (FIG. 6). In order to produce a minimum signal R by varying $\alpha\ddot{x}$, the sign of $\alpha\ddot{x}$ must be chosen so that $\alpha\ddot{x}$ is subtracted from $F_0$ when the reactive force is positive and added to $F_0$ when the reactive force is negative. When $\alpha$ is adjusted to make R a minimum then $\alpha\ddot{x}$ represents the reactive force ($Fr$) and R represents the damping force. The operator can determine whether to make $\alpha$ a positive or negative by observing R as $\alpha$ is increased from a zero value. When the correct sign for $\alpha$ is chosen, R will at first decrease when $\alpha$ is increased from a zero value. An arrangement of the components required for mechanical impedance determination is shown in FIG. 3. The coefficient $\alpha$ can be made either positive or negative by the position of switch 31. In the diagram, however, the switch is in a position to make $\alpha$ negative. In the other switch position the inverter would be bypassed and the output at terminal 20 would be $F + \alpha\ddot{x}$. The operation of the analyzer is now described with the switch in the position shown in FIG. 3.

In FIG. 3 the apparatus is shown set up to measure directly the mechanical impedance or the ratio of force to velocity. The force F is a vector equal to $F_r + jF_d$ where $F_r$ is the component due to the reactive properties of the specimen and $F_d$ is the component due to the damping properties of the specimen.

In the measurement, a mechanical impedance pickup 26 is held against the specimen or structure 27 whose impedance is to be measured. The mechanical impedance pickup may be a rigid structure consisting of an exciter 28, a force pickup 29 and an accelerometer 30. The output of the accelerometer 30 is fed through the amplifier 13, the inverter 15, the coefficient multiplier 17, to the adder 18. The output of the force pickup 29 is fed through the amplifier 14 to the adder 18.

In use, the coefficient $\alpha$ is adjusted so that the output of the adder 18 appearing at terminal 20 is a minimum as displayed on the oscilloscope 22 or on the vacuum tube volt meter 23. At this adjustment, the damping force $F_d$ appears at terminal 20, the total force F appears at terminal 24 and the reactive component of the force $F_r$ appears at terminal 25. The reason for this is that the reactive component of the force is in phase with the output of accelerometer 30, while the damping component of force in the structure whose impedance is to be measured is 90° out of phase with the reactive component. Accordingly, when the voltage appearing at terminal 20 is a minimum, the voltage appearing at terminal 20 corresponds to the damping force and the voltages appearing at terminals 24 and 25 correspond to the total force and to the reactive component of the force. By dividing these voltages by the exciter frequency in radians per second, the reactive and damping components of the mechanical impedance are obtained directly.

The apparatus can be used for measurement of the magnitude and phase of periodic electrical signals from any source provided there is available another signal in phase with a component (real or imaginary) of the signal to be measured. The use of operational amplifiers 15—18 applies analogue computer techniques to the measurement.

The embodiments of the invention in which an exclusive property or privilege is claimed are defined as follows:

1. Apparatus for measuring the dynamic modulus of elastomers and the like comprising a shake table driven by an exciter, a mass, a test specimen of the material whose dynamic modulus is to be measured connected in load carrying relation between the mass and the shake table, a first accelerometer responsive to the instantaneous acceleration of the mass, a second accelerometer responsive to the instantaneous acceleration of the shake table, means for subtracting from the output of the first accelerometer the product of a coefficient times the difference between the outputs of the first and second accelerometers, means for adjusting the coefficient to make the result of the subtraction a minimum whereby the result of the subtraction is proportional to the damping modulus of the test specimen, and the product of the coefficient times the difference between the outputs of the first and second accelerometers is proportional to the elastic modulus of the test specimen.

2. Apparatus for measuring the dynamic modulus of elastomers and the like comprising a shake table driven by an exciter, a mass, a test specimen of the material whose dynamic modulus is to be measured connected in load carrying relation between the mass and the shake table, means sensing the absolute acceleration of the shake table, means sensing the absolute acceleration of the mass, means for subtracting from the absolute acceleration of the mass the absolute acceleration of the shake table to obtain the relative acceleration of the shake table, and means subtracting from the absolute acceleration of the mass an adjustable fraction of the relative acceleration of the mass whereby the minimal result of the subtraction is proportional to the damping modulus of the test specimen.

3. Apparatus for measuring mechanical impedance of a specimen at an excited frequency comprising a mechanical impedance pickup consisting of an accelerometer, a force pickup and an exciter in an assembly to be held against the specimen whose impedance is to be measured, means for subtracting from the output of the force pickup a coefficient times the output of the accelerometer, means for adjusting the coefficient to make the result of the subtraction a minimum whereby the result of the subtraction is proportional to the damping impedance of the specimen at the exciting frequency and the product of the coefficient times the output of the accelerometer is proportional to the reactive impedance of the specimen at the exciting frequency.

4. Apparatus for measuring mechanical impedance of a specimen, comprising means for exciting the specimen at the frequency at which the impedance is to be measured, an accelerometer and a force pickup driven by the specimen, means for subtracting from the output of the force pickup a coefficient times the output of the accelerometer, means for adjusting the coefficient to make the result of the subtraction a minimum whereby the result of the subtraction is proportional to the damping impedance of the specimen at the exciting frequency and the product of the coefficient times the output of the accelerometer is proportional to the reactive impedance of the specimen at the exciting frequency.

5. Apparatus for measuring the real and imaginary components of a first voltage comprising means producing a second voltage in phase with the real component of the first voltage, a first operational amplifier for multiplying the second voltage by an adjustable coefficient, a second operational amplifier for adding the first voltage and the output of the first operational amplifier whereby, when the output of said first operational amplifier is adjusted in magnitude and sign to produce a minimum output of said second operational amplifier, the output of the first operational amplifier corresponds to the real component of said first voltage and the output of the second operational amplifier corresponds to the imaginary component of said first voltage.

6. Apparatus for measuring the real and imaginary components of a first voltage comprising means producing a second voltage in phase with the imaginary component of the first voltage, a first operational amplifier for multiplying the second voltage by an adjustable coefficient, a second operational amplifier for adding the first voltage and the output of the first operational amplifier whereby, when the output of said first operational amplifier is adjusted in magnitude and sign to produce a minimum output of said second operational amplifier, the output of the first operational amplifier corresponds to the imaginary component of said first voltage and the output of the second operational amplifier corresponds to the real component of said first voltage.

References Cited in the file of this patent
UNITED STATES PATENTS

| | | |
|---|---|---|
| 2,355,194 | Wiggins | Aug. 8, 1944 |
| 2,733,596 | Painter | Feb. 7, 1956 |
| 2,873,604 | Samsel | Feb. 17, 1959 |